3,309,172
PRODUCTION OF CHROMIC CHLORIDE
Winslow H. Hartford, Manlius, and Ernest B. Hoyt, Geddes, N.Y., assignors to Allied Chemical Corporation, New York, N.Y., a corporation of New York
No Drawing. Filed Oct. 28, 1964, Ser. No. 407,222
8 Claims. (Cl. 23—87)

This invention relates to manufacture of chromium compounds, and more particularly to a new and improved process for producing anhydrous chromic chloride from chromium oxide.

A number of methods for producing chromic chloride have been proposed. However, chromic chloride has remained a material which in the past has been prepared with considerable difficulty, even on a laboratory or limited pilot plant scale. For example, it is known that chromic chloride may be prepared by passing chlorine gas over ferrochrome or chromium metal at high temperatures.

In recent years the expanding use of chromic chloride has made this material of increasing importance for manufacture of catalysts and organic compounds of chromium. Methods have been also developed whereby chromium metal may be produced from high purity chromic chloride if a low cost source of this material is made available.

Chromic oxide is a relatively low cost starting material from which chromic chloride may be produced. No satisfactory process for making suitable chromic chloride from chromic oxide has, however, been proposed.

An object of the present invention is to provide a new and improved process for producing chromic chloride.

Another object of the invention is to provide a practical and efficient continuous process for producing high purity chromic chloride from chromic oxide by reaction with chlorine and carbon monoxide.

Other objects and advantages will be evident from the following description of the invention.

It has been found in accordance with the invention that high purity chromic chloride may be produced from chromic oxide utilizing chlorine and carbon monoxide by subjecting chromic oxide to reaction in the fluidized state with a gas containing at least about 10% excess of chlorine and at least about a 100% excess of carbon monoxide, desirably in the presence of a substantial amount of an inert particulate material, preferably silica sand, at a temperature regulated above about 920° C., preferably 925–960° C., to convert the chromic oxide to volatile chromic chloride which may be thereafter condensed to recover high purity chromic chloride.

An essential condition in carrying out the invention is the use of at least about a 100% excess of carbon monoxide over the amount theoretically required to convert chromic oxide to chromic chloride. Lesser amounts of carbon monoxide fail to give good results as found during our experimentation with amounts as much as 50% in excess soon resulting in depreciation of the reaction and failure of the operation. In the process of the invention particularly good results are obtained when the amount of carbon monoxide employed is 150–250% in excess of the theoretical requirement. The upper limit of the amount of carbon monoxide which may be employed is not particularly critical and mostly a matter of convenience and economy. Generally, an amount greater than a 300% excess of carbon monoxide does not yield any significant additional benefit. Normally, the use of a large excess amount of carbon monoxide might be expected to cause substantial contamination of the chromic chloride product due to the instability of carbon monoxide on cooling below 700° C. Despite the use of the large excess amounts required in the present invention it has been found surprisingly that such excess of carbon monoxide does not result in any substantial carbon contamination and the chromic chloride product is of high purity.

The process of the present invention is preferably carried out in a fluidized bed reactor which may be of the conventional type having gas feed inlet in the lower portion and outlet in the upper portion to withdraw vapors of the chromic chloride product. The chromic oxide reactant may be introduced in the fluidized bed along with the gas feed entering the lower portion or through a separate inlet in the upper section of the reactor. Hence, bottom or top feeding may be employed to feed the chromic oxide to the reactor. The chromic oxide employed in the process should be of high purity and essentially free of other chloride forming metals such as iron, aluminum, and magnesium which would result in contamination of the product. The chromic oxide employed may be prepared by any suitable procedure such as by reaction of sodium dichromate and sulfur. Chromic oxide may also be prepared by reaction of sodium dichromate in solution with reducing agents followed by calcination of the resulting hydrous oxide. As employed in the process the chromic oxide may be in any desired form including granular and also the more finely divided pigment grades. The finer chromic oxide materials may be pelletized to obtain larger aggregate particles which may also be used. The rate of feed of chromic oxide to the fluidized bed is desirably such that the volatile chromic chloride product is rapidly and quantitatively formed and liberated from the fluidized bed in the exit gas stream. The chromic chloride product may be readily recovered by condensation by known procedures in virtually pure condition from the exit vapor stream.

Another important factor in carrying out the invention is the use of an excess of chlorine over the amount theoretically required to convert the chromic oxide to chromic chloride. Several factors have been found to require an excess of chlorine in order to obtain satisfactory results in carrying out the invention. Unless chlorine is present in excess there is some tendency toward incomplete conversion of the chromic oxide with resultant formation of chromous chloride which tends to fuse within the bed and interfere with the reaction. An excess of chlorine also favors the formation of chromium tetrachloride which increases the apparent volatility of the chromium from the reaction mass. Generally, a chlorine excess of about 10% is required to give satisfactory results. The upper limit of the amount of chlorine which may be used is less important and the excess employed may be as much as 100% and even higher. A chlorine excess of about 15–80% has been found to give best results under preferred operating conditions. In the more preferred forms of practice the chlorine is admixed with the carbon monoxide and the resulting mixture fed to the reactor to maintain the fluidized bed. If found desirable the chlorine and carbon monoxide may be admixed with an inert gas such as carbon dioxide or nitrogen prior to introduction into the reactor.

It is also important to maintain the reaction temperature above about 920° C. Below a temperature of about 920° C. undesirable side reactions may take place in the fluidized bed causing formation of impure $CrCl_3$. A reaction temperature above 920° C. has also been found important to produce a chromic chloride product of desired low hygroscopicity. The upper limit of the reaction temperature in the fluidized reaction zone is not particularly critical and mostly a matter of economy and temperature limitation of the particular materials employed in construction of the reactor. Temperatures in the reaction zone may range up to as high as about 1100° C. Particularly good results are obtained when the reaction temperature is regulated within the lower range temperatures of about 925–960° C.

In carrying out the invention in the fluidized state an inert solid such as silica sand may be used to improve fluidization and yields, particularly when employing the finer chromic oxide grades having particle size less than 100 Tyler Standard Mesh. Continuous feeding of very fine chromic oxide may also be facilitated by admixing with an inert particulate material. It has also been found that particularly excellent results are obtained when the reaction is carried out in the presence of a substantial amount of an inert solid. The ratio by weight of the inert solid to chromic oxide in the feed to the reactor is desirably regulated above about 1:1, preferably between about 2:1 to 5:1. Increasing the ratio of inert material to chromic oxide to in excess of 10:1 offers no added advantages and is generally impractical. When employing such large amounts of an inert solid material, not only is fluidization enhanced but reaction rates and efficiency are also considerably improved to a high level. When an inert material is used in the more preferred forms of practice the production of chromic chloride proceeds very rapidly such that the ratio of inert material to unreacted chromic oxide within the fluidized bed is usually in excess of 50:1. The size of the inert material is selected according to operating conditions so as to be retained in the reactor and not carried over in the vapor stream exciting the fluidized bed. Actual particle size may vary considerably and preferably lies in the range of about 20–150 Tyler Standard Mesh, desirably between about 50–100 Tyler Standard Mesh. Silica sand is the preferred inert solid although any suitable inert particulate material may be used such as fused alumina, zirconia and mullite. The inert materials employed preferably have bulk density of about 60–120 lbs./cu. ft. desirably within the range of about 70–100 lbs./cu. ft. When introducing the inert material along with the chromic oxide into the reactor the inert solids will build-up in the bed. The inert material may be withdrawn either continuously or periodically from the reactor to regulate the fluidized bed at about a constant level. Removal from the reactor may be effected through suitable discharge outlets located either at the bottom or the upper sections of the reactor. Under preferred conditions withdrawal is made at the lower portion of the bed where relatively little chromic oxide is found, the ratio of inert material being usually at least 50:1. Any chromic oxide removed along with inert material may be returned to the reactor either by separating from the inert solids or simply by addition of fresh chromic oxide to the withdrawn material to form a mixture to be used as feed to the fluidized bed.

The following examples demonstrate the practice and advantages of the present invention.

Example 1

Chromic chloride was prepared by reaction of chromic oxide with chlorine and carbon monoxide in a 2 inch diameter Vycor reactor having height of about 48 inches and equipped with a 1 inch inlet at the bottom and a 1 inch outlet 4″ below the top. The outlet at the top of the reactor was attached to an air-cooled nickel condenser for cooling and recovering of the chromic chloride product. A 1 inch inlet for introduction of solids was located at the top and a 1 inch outlet for withdrawal of solids was located at the bottom. The chromic oxide employed was finely divided metallurgical grade. The chromic oxide was admixed in a conical mixer with 3 parts by weight of sand per part of chromic oxide. The sand employed had a particle size such that at least 98% was minus 50 mesh and 100% plus 100 mesh. The reactor was charged with about 500 grams of sand which was initially fluidized using a gas fed to the reactor at the rate of 3.06 cu./ft. per hour and consisting of chlorine and carbon monoxide. The amount of chlorine was equivalent to a feed rate of 1.02 cu./ft. per hour while the amount of carbon monoxide was equivalent to a rate of 2.04 cu./ft. per hour. The amount of chlorine employed represented about 50% excess while the amount of carbon monoxide in the gas represented about a 200% excess over the amount theoretically required to convert the chromic oxide to chromic chloride. The fluidized bed was brought to a temperature of about 950° C. by an external electrical resistance heater which surrounded the Vycor reactor throughout approximately 36 inches of its height. Chromic oxide admixed with sand in the weight ratio of about 1 to 3 was then charged to the reactor at a rate of about 160 grams per hour. Superficial flow rate of the gas through the fluidized bed at equilibrium and at 950° C. was about 0.171 ft./sec. Throughout the run the height of the fluidized bed was regulated within the range of about 8–12 inches by periodically withdrawing the sand from the solids discharge outlet in the lower portion of the reactor. After extensive continuous operation the process was still proceeding smoothly and the sand recovered from the bed found to be white in color with no evidence of either chromic oxide or chromic chloride. From the gas stream exiting the top of the reactor there was condensed and recovered chromic chloride at the rate of about 83 grams per hour. Analysis of the chromic chloride product showed a high purity of over 98% with only about 0.3% chromic oxide. No detectable carbon was found in the product. The uncondensed portion of the off-gas contained about 57% carbon monoxide, 28% carbon dioxide and about 15% chlorine. Chlorine utilization in the reactor was about 66%. Yield of chromic chloride was a high 97%.

Example 2

Apparatus and procedure were similar to Example 1. The Vycor reactor was charged with 500 grams of sand having screen analysis similar to the sand employed in Example 1. Fluidization was initiated employing a gas fed to the reactor at the rate of about 2.38 cu./ft. per hour and consisting of chlorine and carbon monoxide. The amount of chlorine was equivalent to a feed rate of 1.02 cu./ft. per hour while the amount of carbon monoxide was equivalent to a rate of 1.36 cu./ft. per hour. The amount of chlorine employed represented about 50% excess while the amount of carbon monoxide in the gas represented about a 100% excess over the amount theoretically required to convert the chromic oxide to chromic chloride. Chromic oxide admixed with sand in the weight ratio of about 1 to 3 was charged to the reactor at a rate of about 160 grams per hour. Superficial flow rate of the gas through the fluidized bed at equilibrium was about 0.133 ft./sec. Height of the fluidized bed was regulated within the range of about 8–12 inches by periodically withdrawing sand from the lower portion of the fluidized bed. During the reaction the fluidized bed was maintained at a temperature of about 950° C. After extensive continuous operation the process was still proceeding smoothly and the sand recovered from the bed found to be white in color with only trace amounts of chromic oxide and without any evidence of chromic chloride. From the gas stream exiting the top of the reactor there was condensed and recovered chromic chloride at the rate of about 83 grams per hour. Analysis of the chromic chloride product showed a high purity of over 98%, less than 1% insoluble material, and only a trace amount of carbon equivalent to less than 0.03%. The uncondensed portion of the off-gas contained about 40% carbon monoxide, 40% carbon dioxide and about 20% chlorine. Chlorine utilization in the reactor was about 66%. From this run it was postulated that at least approximately a 100% excess of carbon monoxide was required for successful operation of the process.

Example 3

Apparatus and procedure were similar to Example 1 except that the chlorine-carbon monoxide gas mixture employed contained about a 50% excess of chlorine and only about a 50% excess of carbon monoxide. After the run had proceeded at equilibrium conditions for a short time it was observed that the sand discharged from the reactor contained small lumps of green chromic oxide and pink chromic chloride. The size and number of the chromic oxide and chromic chloride lumps increased fairly rapidly resulting in a sharp decrease of fluidization of the bed as indicated by an approximately zero reading on a back pressure gauge. Operation became ineffective and the run was terminated. Examination of the reactor revealed the presence of many various sized lumps of chromic oxide and chromic chloride cemented together within the reactor. A substantial amount of this material had also adhered to the reactor wall and could only be removed with the aid of metal probing rods. It was postulated that failure of the operation was due at least in part to the formation of only partially chlorinated material, presumably chromous chloride, which had fused within the bed and caused shutdown of the operation. Yield of chromic chloride was only 55% further indicating the importance of employing at least about a 100% excess of carbon monoxide.

Although certain preferred embodiments of the invention have been disclosed for purpose of illustration, it will be evident that various changes and modifications may be made therein without departing from the scope and spirit of the invention.

We claim:
1. The process for the production of high purity chromic chloride which comprises subjecting chromic oxide substantially free of other metals forming metal chlorides to reaction in a fluidized bed with a gas containing at least about a 10% excess of chlorine and at least about a 100% excess of carbon monoxide in the presence of an inert particulate material in a ratio of said particulate material to chromic oxide of at least 1:1 at a temperature above 920° C. up to about 1100° C. to convert the chromic oxide by reaction with the chlorine and carbon monoxide as essentially the sole reactants to chromic chloride, and recovering chromic chloride of at least 98% purity.

2. The process of claim 1 in which the chlorine is present in an excess of about 15–60% and the carbon monoxide is present in an excess of about 150–300%.

3. The process of claim 1 in which the reaction temperature is 925–960° C.

4. The process of claim 1 in which the inert particulate material has an average bulk density between 60–120 lbs. per cu. ft.

5. The process of claim 1 in which the inert material has a particle size between 20–150 Tyler Standard Mesh.

6. The process for the production of high purity chromic chloride which comprises maintaining a fluidized bed including an inert particulate material, and adding to said bed a mixture of inert material and chromic oxide substantially free of other metals forming metal chlorides in which the weight ratio is between 1:1 to 10:1 while subjecting the chromic oxide within the bed to reaction with a gas containing at least about a 10% excess of chlorine and at least about a 100% excess of carbon monoxide at a temperature above 920° C. up to about 1100° C. to convert the chromic oxide by reaction with the chlorine and carbon monoxide as essentially the sole reactants to chromic chloride, and recovering chromic chloride of at least 98% purity.

7. The process of claim 6 in which the inert particulate material is silica.

8. The process of claim 6 in which there is continuously added to said bed a mixture of inert particulate material and chromic oxide in a weight ratio between about 2:1 to 5:1 and said inert material is withdrawn from said bed to regulate said bed at approximately a constant level.

References Cited by the Examiner

UNITED STATES PATENTS

| | | | |
|---|---|---|---|
| 2,277,220 | 3/1942 | Gailey | 23—87 X |
| 2,349,747 | 5/1944 | Muskat | 23—87 X |
| 2,985,507 | 5/1961 | Wienert | 23—87 |

OSCAR R. VERTIZ, *Primary Examiner.*

EDWARD STERN, *Examiner.*